(12) United States Patent
West

(10) Patent No.: US 11,305,897 B2
(45) Date of Patent: Apr. 19, 2022

(54) MOON COMPLEX, ORBITING DOCKING SPACEPORT, AND METHODS OF USE AND TRANSPORTATION

(71) Applicant: Brandon West, Roswell, GA (US)

(72) Inventor: Brandon West, Roswell, GA (US)

(*) Notice: Subject to any disclaimer, the term of this patent is extended or adjusted under 35 U.S.C. 154(b) by 0 days.

(21) Appl. No.: 17/137,571

(22) Filed: Dec. 30, 2020

(65) Prior Publication Data

US 2022/0055777 A1 Feb. 24, 2022

Related U.S. Application Data

(60) Provisional application No. 63/068,417, filed on Aug. 21, 2020.

(51) Int. Cl.
*B64G 99/00* (2009.01)
*B64G 1/24* (2006.01)
(Continued)

(52) U.S. Cl.
CPC ............... *B64G 9/00* (2013.01); *B64G 1/24* (2013.01); *B64G 1/40* (2013.01); *B64G 1/60* (2013.01); *B64G 1/62* (2013.01); *B64G 1/646* (2013.01); *B64G 5/00* (2013.01); *B64G 7/00* (2013.01); *E04H 6/44* (2013.01); *E04H 9/00* (2013.01)

(58) Field of Classification Search
CPC ... B64G 9/00; B64G 7/00; B64G 1/62; B64G 5/00; B64G 1/60; B64G 1/40; B64G 1/646; B64G 1/24; E04H 9/00; E04H 6/44

See application file for complete search history.

(56) References Cited

U.S. PATENT DOCUMENTS 3,169,725 A * 2/1965 Berglund ............ B64G 1/12
                                              244/158.3
3,670,581 A * 6/1972 Holland ............... B64G 7/00
                                              74/86

(Continued)

FOREIGN PATENT DOCUMENTS

CN   204905941 U  * 12/2015
CN   109982933 A  *  7/2019 ............... F03H 3/00

(Continued)

OTHER PUBLICATIONS

Conference Digest—IEEE Aerospace Conference (Year: 2017).*
Conference Digest—IEEE Aerospace Conference (Year: 2020).*

*Primary Examiner* — Behrang Badii
*Assistant Examiner* — Jalal C Coduroglu
(74) *Attorney, Agent, or Firm* — Mathew L. Grell; Grell & Watson Patent Attorneys LLC

(57) ABSTRACT

A moon/planet complex, an orbiting docking spaceport, and transportation vehicles therebetween that includes i) moon/planet base station having a landing platform with a plurality of charged plates; ii) a moon/planet orbiting craft, docking spacecraft having landing platform with a plurality of charged plates; iii) a personnel transport spacecraft to shuttle personnel between an orbiting craft and planetary/moon base station having rotating electromagnetic rings 320 and/or rotating electromagnetic plates to interact with charged plates; iv) a large personnel/cargo transport spacecraft to shuttle personnel between an orbiting craft and planetary base station having rotating electromagnetic plates to interact with charged plates.

26 Claims, 7 Drawing Sheets

(51) Int. Cl.
  *B64G 1/40* (2006.01)
  *B64G 1/60* (2006.01)
  *E04H 9/00* (2006.01)
  *B64G 1/64* (2006.01)
  *B64G 7/00* (2006.01)
  *B64G 5/00* (2006.01)
  *E04H 6/44* (2006.01)
  *B64G 1/62* (2006.01)

(56) References Cited

U.S. PATENT DOCUMENTS

| | | | | |
|---|---|---|---|---|
| 4,730,797 A * | 3/1988 | Minovitch | | B64G 9/00 244/158.3 |
| 4,747,567 A * | 5/1988 | Johnson | | B64G 1/222 136/245 |
| 4,775,120 A * | 10/1988 | Marwick | | B64G 1/62 376/288 |
| 4,795,113 A * | 1/1989 | Minovitch | | B64G 1/14 104/138.1 |
| 4,872,625 A * | 10/1989 | Filley | | B64G 1/12 244/159.4 |
| 4,964,596 A * | 10/1990 | Ganssle | | B64G 1/646 244/172.5 |
| 5,064,151 A * | 11/1991 | Cerimele | | B64G 1/62 244/172.1 |
| 5,145,130 A * | 9/1992 | Purves | | B25J 5/00 244/159.4 |
| 5,211,006 A * | 5/1993 | Sohnly | | B64G 1/405 60/202 |
| 5,364,046 A * | 11/1994 | Dobbs | | B64G 1/646 244/172.4 |
| 5,395,072 A * | 3/1995 | Nelson | | B64G 1/14 244/119 |
| 6,311,926 B1 * | 11/2001 | Powell | | B64F 1/04 104/123 |
| 6,386,484 B1 * | 5/2002 | Hoyt | | B64G 1/648 244/158.2 |
| 6,421,493 B1 * | 7/2002 | Burek | | G02B 6/3885 385/134 |
| 6,431,497 B1 * | 8/2002 | Hoyt | | B64G 1/648 244/158.2 |
| 6,433,494 B1 * | 8/2002 | Kulish | | H05H 1/54 250/251 |
| 6,491,258 B1 * | 12/2002 | Boyd | | B64G 1/007 244/158.1 |
| 6,577,930 B2 * | 6/2003 | Belbruno | | B64G 1/007 701/13 |
| 6,612,522 B1 * | 9/2003 | Aldrin | | B64G 1/002 244/159.3 |
| 7,559,508 B1 * | 7/2009 | Taylor | | B64G 1/242 244/172.2 |
| 7,562,670 B1 * | 7/2009 | Jones | | F16K 17/40 137/318 |
| D675,088 S | 1/2013 | West | | B64G 1/52 D9/418 |
| 10,246,200 B2 * | 4/2019 | Williams, Sr. | | B64G 1/12 |
| 10,696,423 B1 * | 6/2020 | Genova | | B64G 1/242 |
| 2002/0079440 A1 * | 6/2002 | Mills | | G21K 1/00 250/281 |
| 2003/0127568 A1 * | 7/2003 | Tchoryk | | B64G 1/646 244/172.4 |
| 2003/0192995 A1 * | 10/2003 | Tchoryk | | B64G 1/646 244/172.4 |
| 2006/0219846 A1 * | 10/2006 | Johnson | | B64G 1/62 244/158.9 |
| 2007/0040067 A1 * | 2/2007 | D'Ausilio | | B64G 1/007 244/172.5 |
| 2007/0221785 A1 * | 9/2007 | Diamandis | | B64G 5/00 244/158.1 |
| 2009/0001221 A1 * | 1/2009 | Collyer | | B64G 1/646 244/172.4 |
| 2009/0127383 A1 * | 5/2009 | Gochnour | | B64G 1/12 244/62 |
| 2010/0051751 A1 * | 3/2010 | Mueller | | B64G 1/52 244/158.9 |
| 2010/0163683 A1 * | 7/2010 | Quine | | B64G 1/002 52/2.21 |
| 2011/0042521 A1 * | 2/2011 | Sample | | B64G 1/002 244/159.3 |
| 2012/0234980 A1 * | 9/2012 | Leventhal | | B64G 9/00 244/158.1 |
| 2013/0233974 A1 * | 9/2013 | Maiboroda | | B64G 1/409 244/158.2 |
| 2014/0033677 A1 * | 2/2014 | Tseliakhovich | | F03H 1/0093 60/202 |
| 2014/0103158 A1 * | 4/2014 | Berry | | B64C 29/0025 244/12.1 |
| 2014/0124626 A1 * | 5/2014 | Clay | | E05D 15/02 244/159.3 |
| 2014/0124627 A1 * | 5/2014 | Clay | | B64G 1/60 244/159.3 |
| 2014/0259995 A1 * | 9/2014 | White | | E04H 9/16 52/173.1 |
| 2015/0219747 A1 * | 8/2015 | Thevenet | | B64G 1/10 342/355 |
| 2016/0045841 A1 * | 2/2016 | Kaplan | | B01D 3/06 429/49 |
| 2016/0264266 A1 * | 9/2016 | Stone | | B64G 1/12 |
| 2016/0335598 A1 * | 11/2016 | Aylmer | | B64G 1/646 |
| 2017/0036782 A1 * | 2/2017 | Dula | | B64G 1/402 |
| 2017/0190446 A1 * | 7/2017 | Williams, Sr. | | B64G 1/002 |
| 2017/0259946 A1 * | 9/2017 | White, Jr. | | B64G 1/405 |
| 2018/0016804 A1 * | 1/2018 | Irons | | E04H 5/08 |
| 2018/0294870 A1 * | 10/2018 | Van Wynsberghe | | B64B 1/44 |
| 2019/0015702 A1 * | 1/2019 | Krebs | | A61B 5/222 |
| 2019/0060684 A1 * | 2/2019 | West | | A62C 2/10 |
| 2019/0077524 A1 * | 3/2019 | Faber | | B64G 1/222 |
| 2019/0135458 A1 * | 5/2019 | West | | B64G 1/007 |
| 2019/0256229 A1 * | 8/2019 | Griffin | | B64G 1/646 |
| 2019/0372426 A1 * | 12/2019 | Van Gelder | | F16D 55/40 |
| 2020/0130871 A1 * | 4/2020 | Drexler | | B64G 1/408 |
| 2020/0148399 A1 * | 5/2020 | de Jong | | B64G 1/402 |
| 2021/0078736 A1 * | 3/2021 | Rogers | | B64G 1/002 |
| 2021/0086923 A1 * | 3/2021 | Halsband | | B64G 1/42 |

FOREIGN PATENT DOCUMENTS

| | | | | |
|---|---|---|---|---|
| CN | 110509067 A | * | 11/2019 | B23P 23/04 |
| CN | 113631481 A | * | 11/2021 | B64G 1/1078 |
| EP | 0631931 A1 | * | 1/1995 | B64G 1/14 |
| EP | 1139127 A2 | * | 10/2001 | G02B 6/4471 |
| JP | 2001281497 A | * | 10/2001 | G02B 6/4471 |
| JP | 2015006650 A | * | 1/2015 | B64G 9/00 |
| RU | 2587763 C2 | * | 6/2016 | F02K 9/72 |
| RU | 2627904 C2 | * | 8/2017 | B64G 9/00 |
| WO | WO-2005108798 A1 | * | 11/2005 | B64C 39/00 |
| WO | WO-2008087496 A2 | * | 7/2008 | B64G 1/002 |
| WO | WO-2013024361 A2 | * | 2/2013 | F02K 9/72 |
| WO | WO-2016097832 A1 | * | 6/2016 | H04B 7/18584 |
| WO | WO-2019024947 A1 | * | 2/2019 | B64G 1/1078 |

* cited by examiner

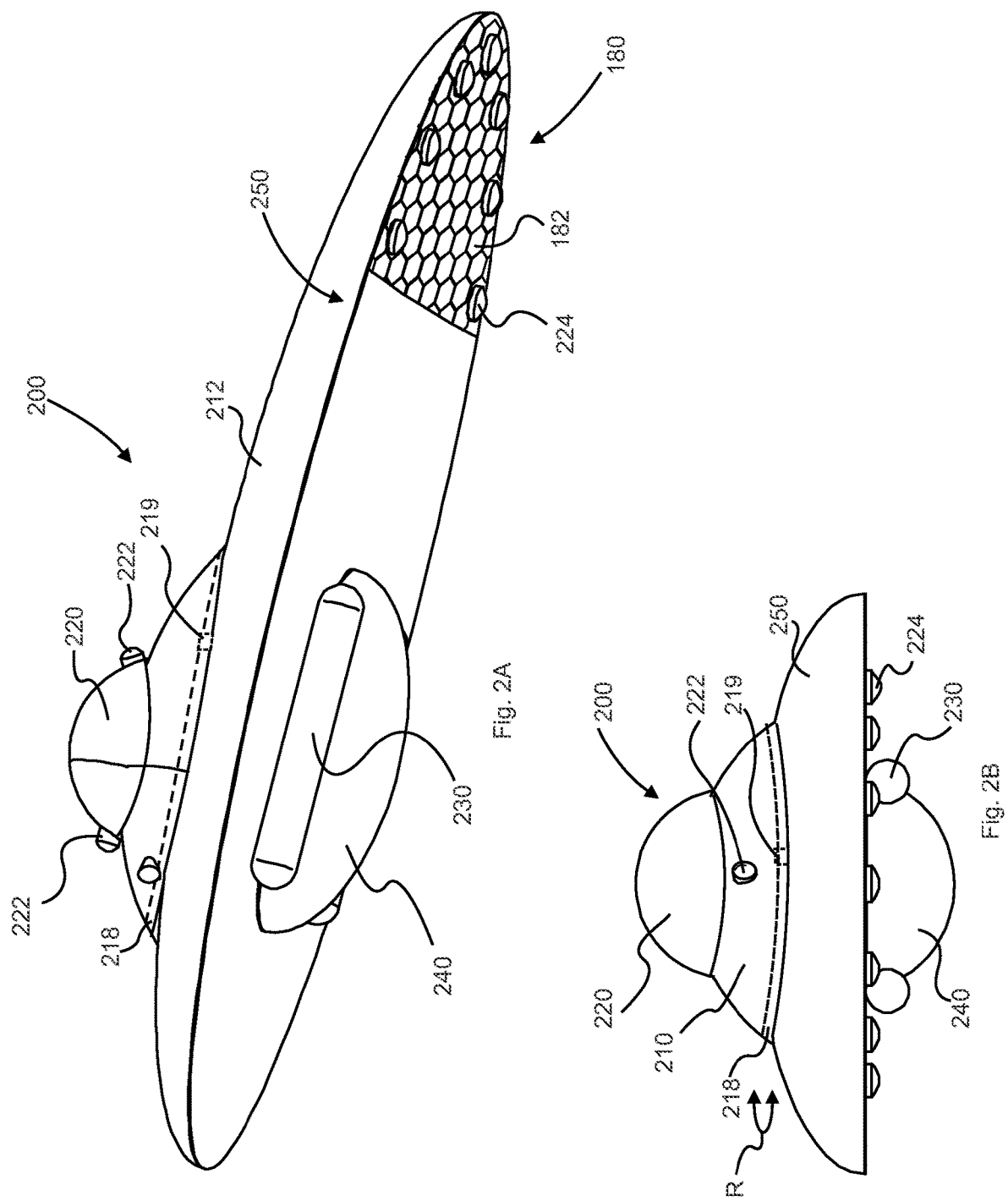

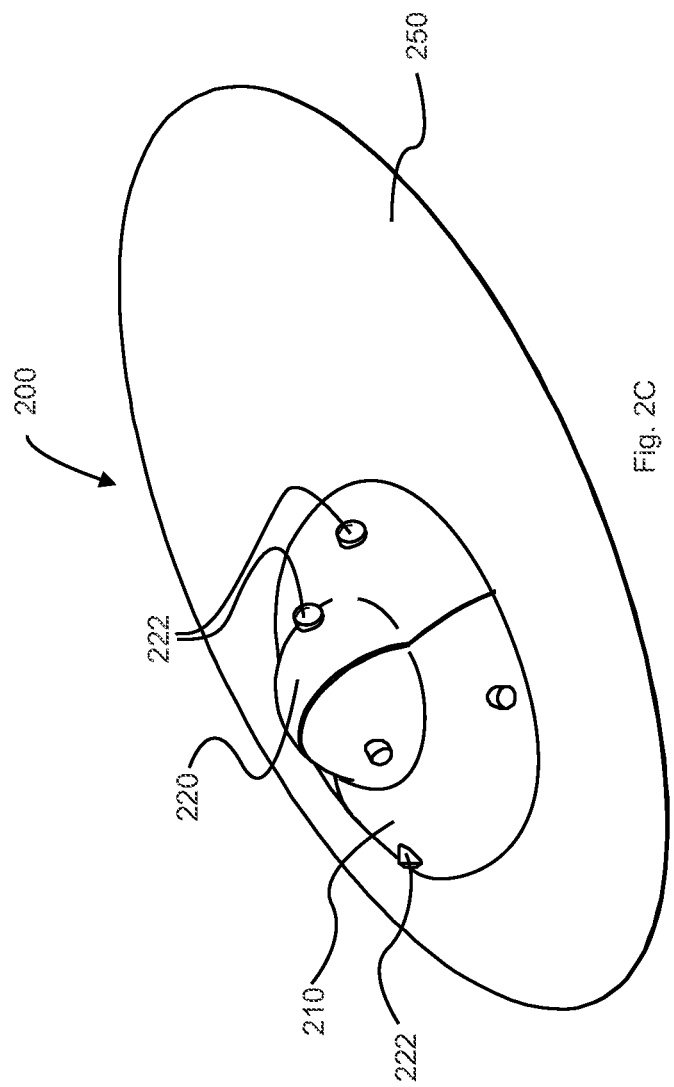
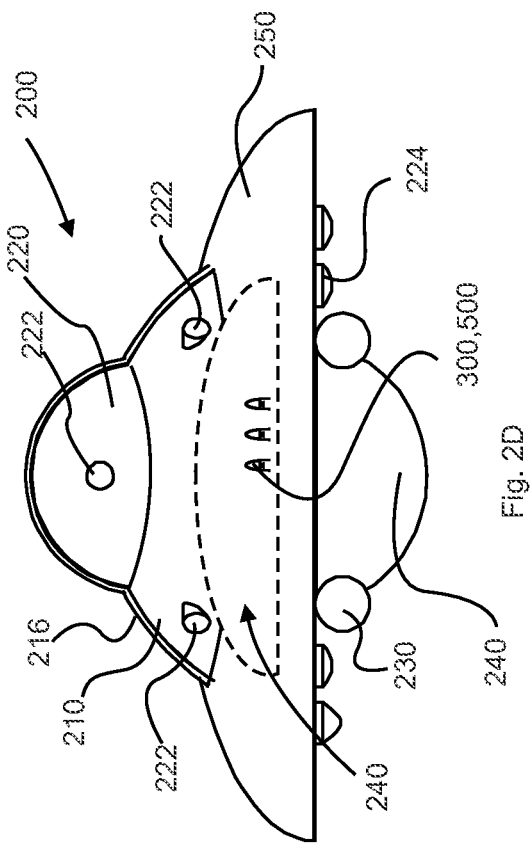

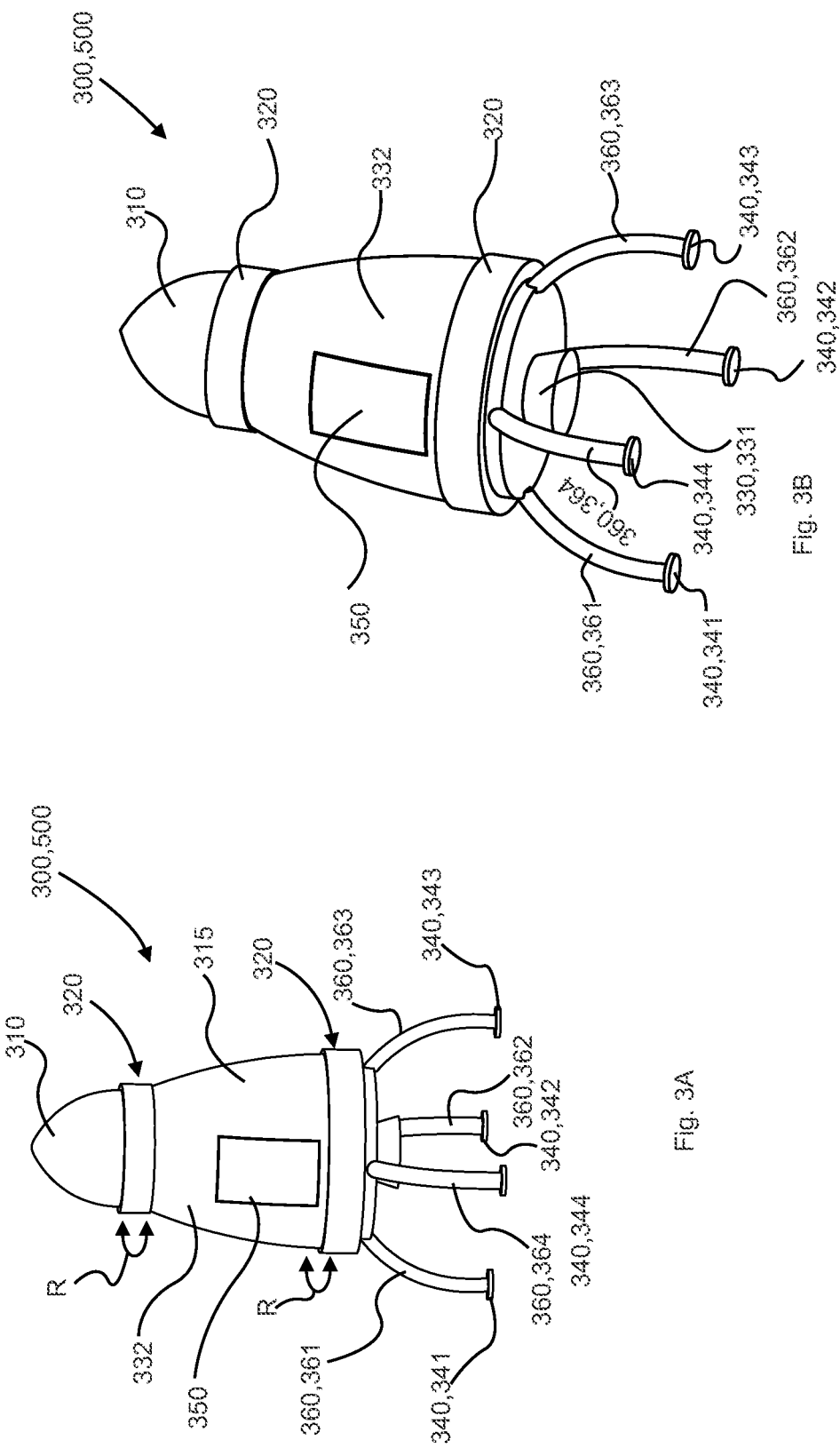

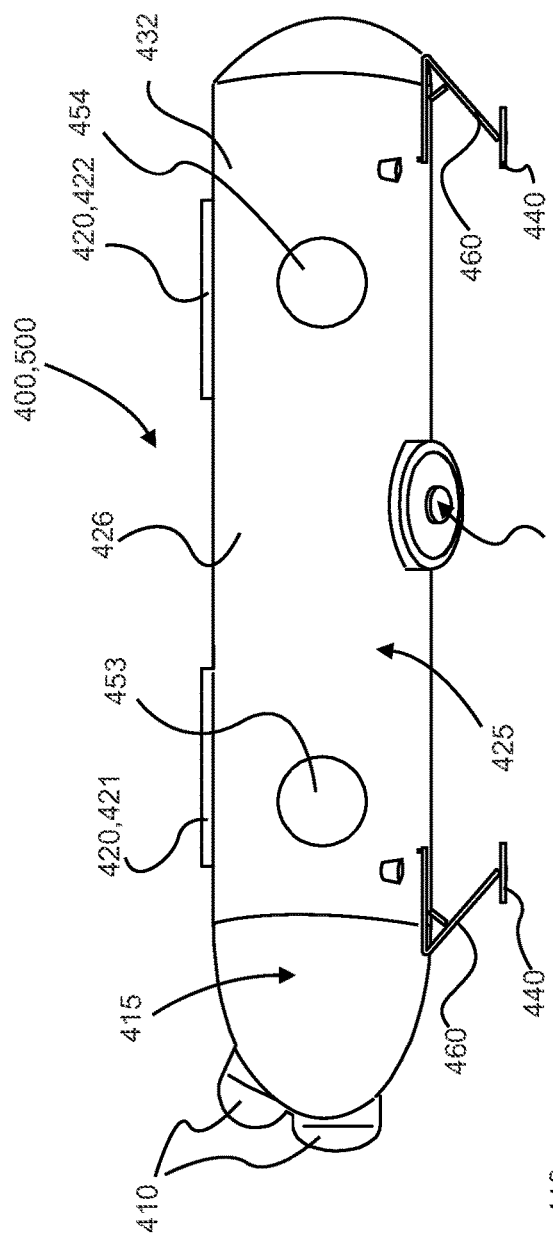
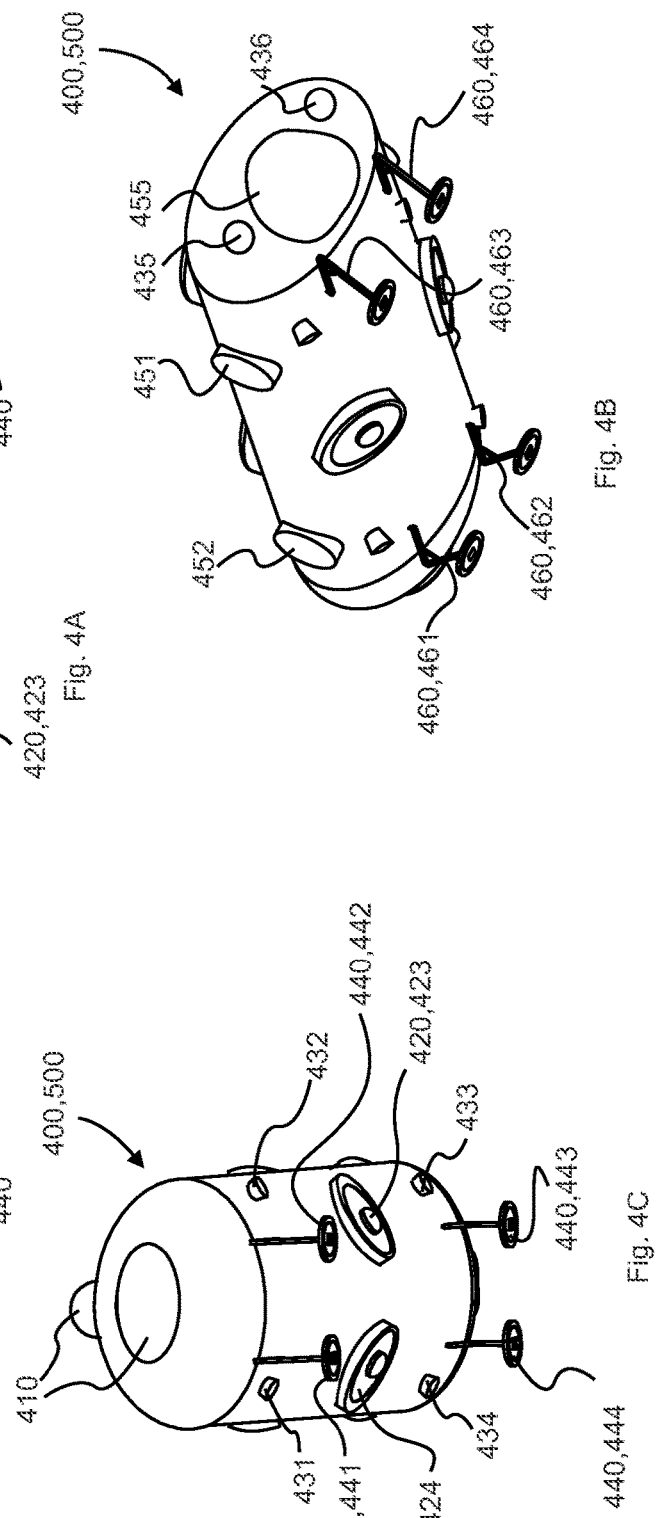
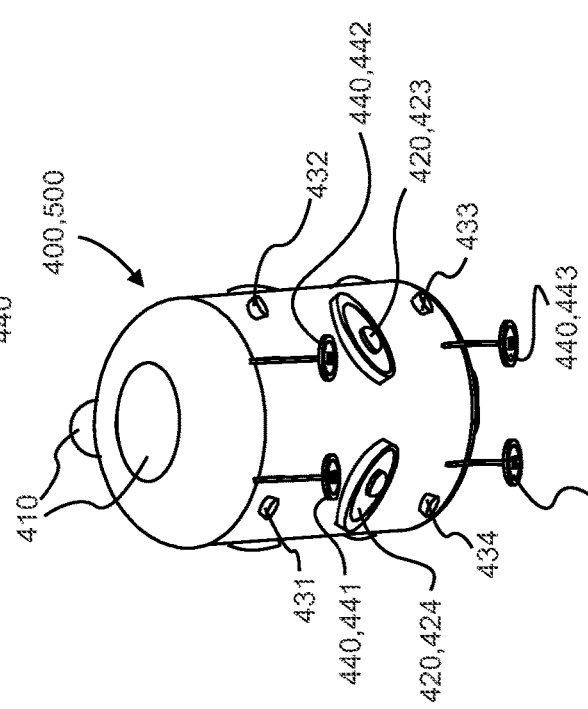

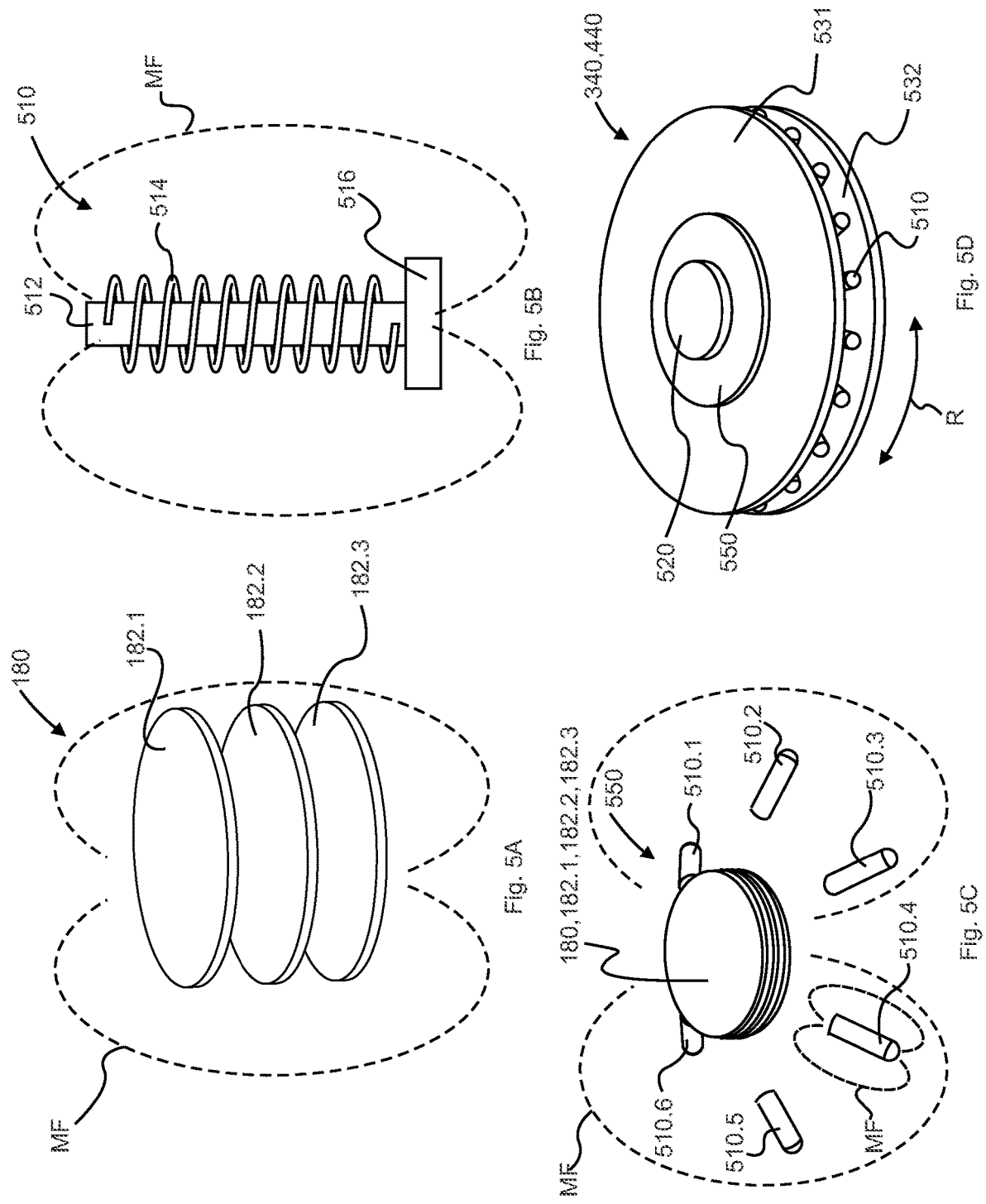

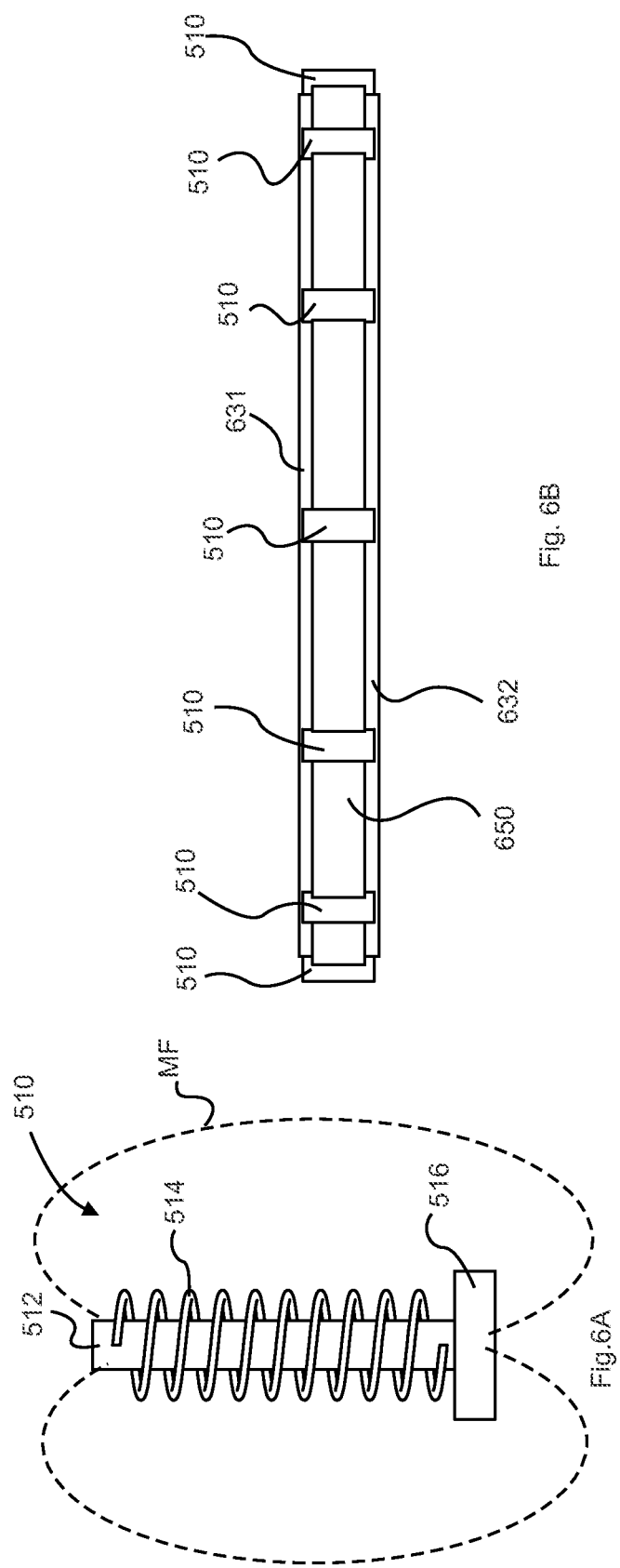

ly stated, the present disclosure in its exemplary form includes a moon/planet orbiting craft, docking, transport of egress spacecraft having a command module, a habitat module, said habitat module and said command module having viewing ports, cameras, sensors, and communication equipment, said habitat module and said command module formed of layered fabric resistant to meteorites and solar radiation, said habitat module and said command module are sealed and rotate to provide enough rotational forces to provide a simulated gravity environment, a spacecraft docking module having a synchronized interface tunnel and a transport module configured to synchronize and lock therebetween said spacecraft docking module/said habitat module and said command module, said spacecraft docking module having docking portals, said docking module having charged plates for steering and controlling a rate of the egress spacecraft, said docking module having docking portals with a control apparatus to secure for internal placement of the egress spacecraft, and a propulsion bay having propulsion engines.

MOON COMPLEX, ORBITING DOCKING SPACEPORT, AND METHODS OF USE AND TRANSPORTATION

CROSS-REFERENCE TO RELATED APPLICATIONS

This application claims the priority benefit of U.S. Provisional Application No. 63/068,417, filed on Aug. 21, 2020, entitled "Moon Complex, Orbiting Docking Spaceport and Methods of Use", which is incorporated by reference herein in its entirety.

FIELD OF THE INVENTION

This disclosure relates to a space based outpost and transportation system and methods of use thereof. More specifically, the disclosure relates to a moon based complex, orbiting module, and cargo and personnel transport vehicles moving therebetween.

BACKGROUND

The NASA Apollo missions to the moon concluded in 1972. Sending humans to the moon comes at a large cost, risks, and technological challenges. If we want to travel to other parts of the solar system we need a moon base. Setting up a moon based outpost is much more difficult than sending a few astronauts to the moon for a few days. Lunar settlers or robotic mechanisms need to make, transform, and grow most of the resources necessary to sustain human life on the moon. Moreover, lunar settlers or robotic mechanisms need to construct structures to protect occupants from space radiation, particularly galactic cosmic rays that can damage electronics and DNA.

Therefore, it is readily apparent that there is a need for a moon complex, orbiting docking spaceport, and methods of use and transportation thereof that functions to enable a combination of features that is designed to address at least some aspects of the problems discussed above. Moreover moon complex, orbiting docking spaceport, and methods of use and transportation enables cargo and personnel transportation therebetween.

SUMMARY

Briefly described, in an example embodiment, the present disclosure overcomes the above-mentioned disadvantages and meets the recognized need for a moon/planet complex, an orbiting docking spaceport, and transportation vehicles therebetween that includes i) moon/planet base station having a landing platform with a plurality of charged plates; ii) a moon/planet orbiting craft, docking spacecraft having landing platform with a plurality of charged plates; iii) a personnel transport spacecraft to shuttle personnel between an orbiting craft and planetary/moon base station having rotating electromagnetic rings 320 and/or rotating electromagnetic plates to interact with charged plates; iv) a large personnel/cargo transport spacecraft to shuttle personnel between an orbiting craft and planetary base station having rotating electromagnetic plates to interact with charged plates.

According to its major aspects and broadly stated, the present disclosure in its exemplary form includes a moon/planet industrial complex/base station for landing personnel transport spacecraft and large personnel transport spacecraft having an underground storage/maintenance module having a thick non-conductive barrier for absorbing any magnetic interference, an underground rotating habitat module, said underground rotating habitat module having a synchronized interface tunnel and a transport module configured to synchronize therebetween said underground rotating habitat module and said underground storage/maintenance module, a landing platform, said landing platform formed of a series of charged plates for steering and control landing of the personnel transport spacecraft and the large personnel transport spacecraft, a personnel elevator, said personnel elevator to move personnel from said underground habitat and storage module to said landing platform, a spacecraft elevator, said spacecraft elevator to move spacecraft from said underground habitat and storage module to said landing platform, a magnetic vortex accelerator shaft having a high energy electromagnetic force to launch/accelerate the personnel transport spacecraft into orbit, a plurality of surface domes for communications equipment/growing food, and a control/observation tower to communicate with the spacecraft.

According to its major aspects and broadly stated, the present disclosure in its exemplary form includes a personnel transport spacecraft to shuttle personnel between an orbiting craft and planetary/moon base station having an a crew and passenger module having spacecraft controls, a propulsion module having a thruster for forward movement, said propulsion module having at least one rotating electromagnetic ring for stability, launching, and docking, said at least one rotating electromagnetic ring having electromagnetic segments to exert a rotating magnetic field, said propulsion module having an entrance/exit hatch, and three or more support arms connected to said propulsion module, said three or more support arms each having a rotating electromagnetic landing plate for stability, launching, and docking.

According to its major aspects and broadly stated, the present disclosure in its exemplary form includes a large personnel/cargo transport spacecraft to shuttle personnel between an orbiting craft and moon/planetary base station having a crew and passenger module having spacecraft controls, a cargo bay, said cargo bay having at least one upper rotating electromagnetic ring and at least one lower rotating electromagnetic ring, for stability, launching, and docking, said at least one rotating cargo bay having a rear cargo hatch, said cargo having three or more support arms connected to said cargo bay, said three or more support arms, each having a strut for shock absorption and a rotating electromagnetic landing plate for stability, launching, and docking, said cargo bay having two or more side thrusters for steering, and a propulsion module having at least one thruster for forward movement.

In an exemplary embodiment A moon orbiting craft for docking and transport of spacecraft, the craft includes a spacecraft body, a habitat module, the habitat module rotates about the spacecraft body to provide rotational forces to simulate a gravity environment, a synchronized interface tunnel formed around the habitat module and between the spacecraft body and the habitat module, the synchronized interface tunnel having a transport module configured to traverse therein to synchronize and lock therebetween the spacecraft body and the habitat module, a command module affixed to the habitat module, an orbiting landing platform configured having a plurality of charged plates to steer and control a rate of the spacecraft, a docking portal for docking of the spacecraft, a propulsion system to maintain a position of the moon orbiting craft.

In an exemplary embodiment, a moon complex on the lunar surface for docking and transport of spacecraft, the moon complex having an underground maintenance module, an underground rotating habitat module proximate the maintenance module, the underground rotating habitat to provide rotational forces to simulate a gravity environment, a synchronized interface tunnel formed around the rotating habitat module and between the underground maintenance module and the rotating habitat module, the synchronized interface tunnel having a transport module configured to traverse therein to synchronize and lock therebetween the underground maintenance module and the rotating habitat module, a surface landing platform positioned on the lunar surface, the landing platform having a plurality of charged plates to steer and control a rate of the spacecraft, and an elevator positioned between the underground maintenance module and the surface landing platform, the elevator to move personnel and cargo between the underground maintenance module and the lunar surface.

In an exemplary embodiment, a personnel spacecraft to shuttle personnel between the moon complex and the moon orbiting craft, the personnel spacecraft includes a control module having spacecraft controls, a passenger module configured to transport the personnel, a craft body affixed on one end to the control module and a propulsion engine affixed to the other end, the propulsion engine configured to maneuver the personnel spacecraft, the craft body having a hatch, the craft body configured having one or more personnel transport rotating electromagnetic rings affixed thereto, the one or more personnel transport rotating electromagnetic rings configured to exert a rotating magnetic field to interact with the plurality of charged plates, and a plurality of landing legs extend from the craft body to stabilize the personnel craft when landing, each of the landing leg having a rotating electromagnetic plate, the rotating electromagnetic plate configured to exert a rotating magnetic field to interact with the plurality of charged plate.

In an exemplary embodiment, a personnel and cargo spacecraft to shuttle personnel and cargo between the moon complex and the moon orbiting craft, the personnel and cargo spacecraft includes a control module having spacecraft controls, a passenger module and a cargo module configured to transport the personnel and cargo, a craft body affixed on one end to the control module and at least one propulsion engine affixed to the other end, the at least one propulsion engine configured to maneuver the personnel and cargo spacecraft, the craft body having a hatch, the craft body configured having at least one upper rotating electromagnetic ring and at least one lower rotating electromagnetic ring affixed thereto, the at least one upper rotating electromagnetic ring and at least one lower rotating electromagnetic ring configured to exert a rotating magnetic field to interact with the plurality of charged plates, and a plurality of landing legs extend from the craft body to stabilize the personnel and cargo craft when landing, each of the landing leg having a rotating electromagnetic plate, the rotating electromagnetic plate configured to exert a rotating magnetic field to interact with the plurality of charged plates.

A feature of the moon/planet complex, orbiting docking spaceport, and methods of use and transportation therebetween is the ability to provide a moon/planet base station for landing personnel transport spacecraft and large personnel transport spacecraft.

Another feature of the feature of moon complex, orbiting docking spaceport, and methods of use and transportation therebetween is the ability to provide a moon/planet base station for lunar settlers or robotic mechanisms to make, transform, and grow most of the resources necessary to sustain human life on the moon/planet and to protect occupants from space radiation, particularly galactic cosmic rays that can damage electronics and DNA.

Yet another feature of the of moon/planet complex, orbiting docking spaceport, and methods of use and transportation therebetween is to provide a base station or structure to explore and mine the lunar soil, and to transform and grow most of the resources necessary to sustain human life on the moon/planet for prolonged habitation.

Yet another feature of the of moon/planet complex, orbiting docking spaceport, and methods of use and transportation therebetween is to provide a base station or structure having a gravity induced module(s) to sustain human life on the moon/planet for prolonged habitation.

Yet another feature of the of moon/planet complex, orbiting docking spaceport, and methods of use and transportation therebetween is its ability to provide a large personnel/cargo transport spacecraft having rotating charge plates to interact with charged plates of landing platform to shuttle personnel between an orbiting craft and planetary base station and to transport personnel, supplies, materials, mined minerals, fuel, harvested water, transformed materials around, to and from the lunar/planetary surface.

Yet another feature of the of moon/planet complex, orbiting docking spaceport, and methods of use and transportation therebetween is its ability to provide a personnel transport spacecraft having rotating charge plates and rotating electromagnetic rings to interact with charged plates of landing platform to shuttle personnel between an orbiting craft and planetary/moon base station, around, to and from the lunar/planetary surface.

These and other features of the moon/planet complex, orbiting docking spaceport, and methods of use and transportation therebetween will become more apparent to one skilled in the art from the prior Summary and following Brief Description of the Drawings, Detailed Description of exemplary embodiments thereof, and Claims when read in light of the accompanying Drawings or Figures.

The terminology used herein is for the purpose of describing particular embodiments only and is not intended to limiting of the invention. As used herein, the term "and/or" includes any and all combinations of one or more of the associated listed items. As used herein, the singular forms "a", "an" and "the" are intended to include the plural forms as well as the singular forms, unless the contest clearly indicates otherwise. It will be further understood that the terms "compromises" and/or "comprising" when used in this specification, specify the presence of stated features, steps, operations, elements and/or components, but do not preclude the presence of addition of one or more other features, steps, operations, elements, components and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present the moon/planet complex, orbiting docking spaceport, and methods of use and transportation therebetween will be better understood by reading the Detailed Description of the Preferred and Selected Alternate Embodiments with reference to the accompanying drawing Figures, in which like reference numerals denote similar structure and refer to like elements throughout, and in which:

FIG. 2A is a perspective view of an exemplary embodiment of a moon/planet orbiting station/craft;

FIG. 2B is a front view of an exemplary embodiment of a moon/planet orbiting station/craft;

FIG. 2C is a top view of an exemplary embodiment of a moon/planet orbiting station/craft;

FIG. 2D is a front view with cross sectional view inside of an exemplary embodiment of a moon/planet orbiting station/craft;

FIG. 3A is a side view of an exemplary embodiment of a personnel transport craft;

FIG. 3B is a perspective view of an exemplary embodiment of a personnel transport craft;

FIG. 4A is a side view of an exemplary embodiment of a personnel and cargo transport craft;

FIG. 4B is a perspective view of an exemplary embodiment of a personnel and cargo transport craft;

FIG. 4C is a perspective underside view of an exemplary embodiment of a personnel and cargo transport craft;

FIG. 5A is a side view of an exemplary embodiment of a rotating electromagnetic plates assembly, according to FIGS. 3-4;

FIG. 5B is a side view of an exemplary embodiment of a super magnet with coil winding, according to FIGS. 3-4;

FIG. 5C is a perspective view of an exemplary embodiment of an internal rotating assembly to rotate super magnets with coil windings, according to FIGS. 3-4;

FIG. 5D is a perspective view of an exemplary embodiment of a rotating electromagnetic plates assembly, according to FIGS. 3, 4, 5A-5C;

FIG. 6A is a side view of an exemplary embodiment of a super magnet with coil winding, according to FIGS. 3-4; and FIG. 6B is a perspective view of an exemplary embodiment of a rotating electromagnetic plates assembly, according to FIGS. 3, 4, 5A-5C.

The present invention will be better understood by reading the Detailed Description with reference to the accompanying drawings, which are not necessarily drawn to scale, and in which like reference numerals denote similar structure and refer to like elements throughout, and in which:

DETAILED DESCRIPTION

Figure 1:
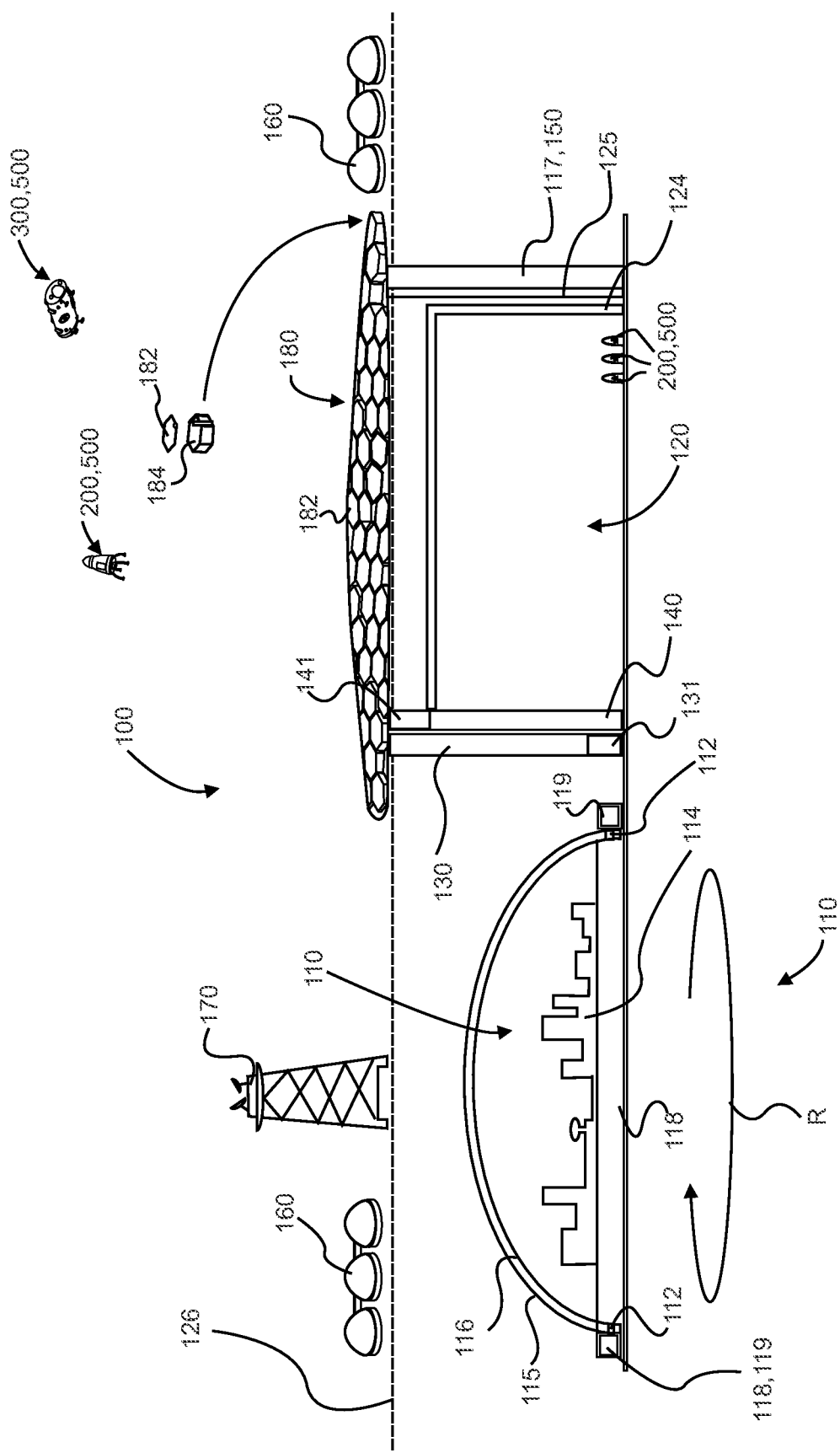
FIG. 1 is a side view of an exemplary embodiment of a moon/planet complex.

In describing the exemplary embodiments of the present disclosure, as illustrated in figures specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

The exemplary embodiments of the present disclosure may be used to explore the moon, mars, and other lunar or planetary explorations (moon/planet).

Referring now to FIG. 1, by way of example, and not limitation, there is illustrated an example embodiment of a self-sufficient moon base or moon outpost, such as moon/planet based complex or moon industrial complex, moon complex 100 may be configured as having underground structures for personnel living quarters, such as rotating habitat module 110 and maintenance, storage, and work area, such as maintenance module 120. Rotating habitat module 110 and maintenance module 120 are preferably positioned underground or below the lunar surface to protect inhabitants, occupants, and equipment from space radiation, particularly galactic cosmic rays that can damage electronics and DNA. The dirt barrier provides not only protection from gamma rays and radiation, but also from temperature changes and solar flares. Rotating habitat module 110 and maintenance work area 120 site selection is preferably positioned on one of the poles of the moon to receive maximum sunlight exposure and minimize surviving the 354-hour lunar night. Moreover, rotating habitat module 110 and maintenance work area 120 site selection may further include positioning within a medium to small size crater to minimize excavation of the site and burial once construction is completed.

Rotating habitat module 110 may be configured as a dedicated enclosure that rotates to provide enough rotational forces, to provide a simulated gravity environment for personnel. This is the main location for all habitat related activities, such as sleeping, eating, exercising, administrative, engineering, conference rooms, laboratory facilities, operations, and any other activity that can be performed remotely. Rotational forces may be provided by tracks, bearings or frozen fluids and electrical-mechanical apparatus or electromagnetic lift and/or rotation or other like rotational apparatus 112 capable of providing rotation R thereto rotating habitat module 110.

Rotating habitat module 110 and maintenance work area 120 may be formed of modular habitat structures 114 and maintenance structures 124, such as inflatable or expandable structures or 3D printed bricks from lunar soil. Moreover, habitat structures 114 may be supported by support structure 115 and enveloped or covered with protective shield 116, made of particles that may be similarly size as the gamma rays and radiation, such as hydrogenated nanotubes or other material transformed from components mined from the lunar soil. A simpler alternative is covering support structure 115, rotating habitat module 110 and modular maintenance structures 124 with a thick layer of lunar soil 126, which will provide shielding from cosmic rays.

Moreover, rotating habitat module 110 may be configured having a transition portal, such as synchronized interface tunnel 118 and transport module 119 travelling therein and configured to synchronize and transport personnel and material therebetween rotating habitat module 110, which rotating habitat module 110 may rotate to provide enough rotational forces to provide a simulated or induced gravity environment, about maintenance work area 120 non-gravity environment. Transport module 119 traverses therein synchronized interface tunnel 118 to accelerate and synchronize and lock with rotating habitat module 110 to enable personnel to transfer into a gravity environment, and then may decelerate and stop to synchronize with maintenance work area 120 via tracks, bearings or frozen fluids and electrical-mechanical apparatus or electromagnetic lift and/or rotation or other like rotational apparatus 112 capable of providing rotation travel thereto transport module 119. Moreover, transport module 119 allows spacecraft/maintenance personnel, to transition from the non-gravity area, maintenance work area 120 to the gravity induced rotating area of rotating habitat module 110.

Furthermore, maintenance structures 124 may be configured with personnel and material transport shafts 130 and elevators 131 capable of moving or transport of personnel and materials between underground maintenance structures 124 and lunar surface 127, to move personnel and materials below lunar surface 127 to underground maintenance structures 124 or for transport personnel and materials for outside activities needed on or above lunar surface 127.

Still furthermore, maintenance structures 124 may be configured with spacecraft and material transport shafts 140 and elevators 141 capable of moving or transport of spacecraft 500 and materials between underground maintenance structures 124 and lunar surface 127 to move spacecraft 500 and materials below lunar surface 127 to underground maintenance structures 124 or for transport spacecraft and materials for outside activities needed on or above lunar surface 127.

Still furthermore, maintenance structures 124 may be configured having magnetic vortex shaft and accelerator 150 capable of accelerating spacecraft 500 from underground maintenance structures 124 to above lunar surface 127. Magnetic vortex shaft and accelerator 150 may include high energy electromagnetic force to launch/accelerate spacecraft 500 in a forward motion, such as into orbit about the moon/planet. U.S. Non-Provisional Application filed on Aug. 11, 2018, entitled "SPACE BASED MAGNETIC VORTEX ACCELERATOR AND METHODS OF USE THEREOF", which is incorporated by reference herein in its entirety. Maintenance structures 124 may be configured having a thick non-conductive barrier, magnetic interference shield 116 for absorbing any magnetic interference when magnetic vortex shaft and accelerator 150 is in operation.

Maintenance work area 120 may be configured with maintenance, storage, manufacturing, material transformation equipment, and the like to assist with long term habitation of the moon/planet. Moreover, maintenance work area 120 may be configured with insulation material 125 to shield maintenance work area 120 from high energy electromagnetic of magnetic vortex shaft and accelerator 150.

Habitat module 110 may be further configured having varying sizes of lunar surface structures, such as shielded domes 160 for housing communications equipment, to communicate with personnel, spacecraft 500, or earth, and food growing equipment for growing food, food habitat dedicated growing areas for all methods of plant and vegetable harvesting, for resident personnel and animals, and to perform material transformation processes via equipment, robots, rovers, or drones, such as extraction equipment to extract oxygen, hydrogen, and other elements from lunar soil 126, rovers to extract ice, or other miming operations, fuel making, and other technology development for long term habitation of the moon/planet. Moreover, shielded domes 160 may house reactors to generate heat and power, such as nuclear reactors.

Habitat module 110 may be further configured having moon/planet surface landing platform 180. Moon/planet surface landing platform 180 may be configured having a plurality of charged plates 182 configured for steering and control landing of spacecraft 500 on the lunar surface. Charged plates 182 may be configured as electromagnetic fields, magnetic fields, charged coils, or any combination thereof, and utilized to control spacecraft 500 landing, or taking off, especially for the purpose of slowing and controlling the rate of decent and stoppage of an approaching or landing spacecraft 500.

The approaching spacecraft 500 will engage their electromagnetic drive segments, while moon/planet surface landing platform 180 engages charged plates 182, controlling descent and ascent of spacecraft 500 to land or depart on/from moon/planet surface landing platform 180.

Habitat module 110 may be further configured having varying sizes of lunar surface 127 structures, such as control/observation tower 170 to house personnel and equipment to communicate with spacecraft 500 and control controlling the rate of decent and stoppage of an approaching or landing spacecraft 500.

Referring now to FIGS. 2A, 2B, 2C, and 2D, by way of example, and not limitation, there is illustrated an example embodiment of a moon/planet orbiting station/craft or moon orbiting docking spaceport, such as moon orbiting craft 200 for the purpose of providing an orbiting station to travel to and from moon complex 100. Moon orbiting craft 200 may be configured as having at least rotating habitat module 210 for prolonged habitation in orbit about the moon/planet, command module 220, space craft body 250 rotationally connected to habitat module 210, spacecraft propulsion system 230, and spacecraft maintenance bay 240 with the entire outer shell of moon orbiting craft 200 made with a layered fabric or shield 216 resistant to meteorites and solar radiation.

It is contemplated herein that rotating habitat module 210 and command module 220 may both rotate together under protective shield 216.

Moreover, habitat module 210 and command module 220 may be configured having a transition birth, such as synchronized interface tunnel 218 configured around a perimeter between habitat module 210 and space craft body 250, and transport module 219 configured to traverse therein synchronized interface tunnel 218 to synchronize and transport personnel and material therebetween rotating habitat module 210 and space craft body 250. Habitat module 210 and command module 220, both modules are part of the same sealed vessel, which rotate to provide enough rotational forces to provide a simulated or induced gravity environment, about stationary space craft body 250 non-gravity environment. Transport module 219 traverses therein synchronized interface tunnel 218 to accelerate and synchronize and lock with rotating habitat module 210 and command module 220 to enable personnel to transfer into a gravity environment, and then may decelerate and stop to synchronize with space craft body 250 and spacecraft maintenance bay 240, via tracks, bearings or frozen fluids and electrical-mechanical apparatus or electromagnetic lift and/or rotation or other like rotational apparatus 212 capable of providing rotation travel thereto transport module 219. Moreover, transport module 219 allows spacecraft/maintenance personnel, to transition from the non-gravity area, which is the remainder of the spacecraft, to the gravity induced rotating area of habitat module 210 and command module 220.

Moreover, space craft body 250 may be enveloped or covered with protective shield 216, possibly made of particles that are a similar size as the gamma rays and radiation, such as hydrogenated nanotubes or other material transformed from components mined from the lunar soil.

Moon orbiting craft 200 may include viewing ports, cameras and other viewing devices, sensors, lasers for distance targeting, and communications equipment, such as spaceport sensors 222 in communication with displays positioned in habitat module 210 and command module 220. Spaceport sensors 222 enable external monitoring of moon orbiting craft 200 while habitat module 210 and command module 220 are rotating about rotational apparatus 212 to simulate gravity.

Moon orbiting craft 200 may include docking portals 224 for spacecraft travelling to and from moon complex 100 or from outer space or earth. Docking portals 224 may be used for docking of spacecraft and internal placement of spacecraft under the control of command module 220, via docking personnel using various devices such as mechanical clamping, hoisting, hydraulics, electromagnetic or other devices capable of latching spacecraft to docking portals 224.

Moon orbiting craft 200 may be further configured having orbiting landing platform 280 positioned preferably on an underside of space craft body 250 and preferably in a forward section of space craft body 250. Orbiting landing platform 280 may be configured having a plurality of charged plates 282 configured for steering and control landing of spacecraft 500, more specifically to steer and control a rate of descent/ascent of the egress spacecraft, spacecraft 500. Charged plates 182 may be configured as electromagnetic fields, magnetic fields, coils, or any combination thereof, and utilized to control spacecraft 500 landing, or taking off, especially for the purpose of slowing and controlling the rate of decent and stoppage of an approaching or landing spacecraft 500 and guiding the direction of ascent of spacecraft 500.

Moon orbiting craft 200 may be further configured having one or more propulsion/steering engines, such as propulsion system 230, whether ion, nuclear, hydrogen, kerosene, or any other standard spacecraft fuel or propulsion system to control launch, transport, travel, maneuvering, docking, and landing of moon/planet orbiting docking spaceport station 200.

Moon orbiting craft 200 may be further configured having maintenance bay 240 positioned proximate landing platform 280, which may preferably include structure in/around/and below one or more propulsion system 230 or between two one or more propulsion system 230. Maintenance bay 240 may be configured for inspection, maintenance, and loading of spacecraft 500.

The approaching spacecraft 500 will engage their electromagnetic drive segments, while moon orbiting craft 200 engages charged plates 282, directing spacecraft 500 to docking portals 224.

Referring now to FIGS. 3A and 3B, by way of example, and not limitation, there is illustrated an example embodiment of a spacecraft 500 or personnel egress transport (pet), such as personnel transport craft 300, a spacecraft designed to transport personnel, crew, and minimal supplies to, from, and between moon complex 100 and moon orbiting craft 200. Personnel transport craft 300 may be configured having crew/flight module, such as control module 310 to maintain crew during transport and enable flight control for the viewing and moon orbiting craft 200. Personnel transport craft 300 may be configured having personnel module 315 to maintain personnel during transport between moon orbiting craft 200 and moon complex 100 and enable flight and transport around moon complex 100. Personnel transport craft 300 may be further configured having craft body 332 affixed on one end to control module 310 and extending therefrom the other end of craft body 332 may be thrusters or steering system, such as one or more propulsion engine 330, whether ion, nuclear, hydrogen, kerosene, or any other standard spacecraft fuel or propulsion system to control launch, transport, travel, maneuvering, docking, and landing of personnel transport craft 300. One or more propulsion/steering engines 330 may be configured having nozzle 331 for the purpose of maneuvering personnel transport craft 300 through controlled vectoring during launching, docking, steering, and landing of personnel transport craft 300, or any movements that require these thrusters to be engaged, such as emergency operations.

Personnel transport craft body 332 may include landing gear or retractable landing gear, such as a set of or plurality of landing legs 360 extending therefrom personnel transport craft body 332. Landing legs 360 may include first landing leg 361, second landing leg 362, third landing leg 363, and fourth landing leg 364 to stabilize docked personnel transport craft 300. Furthermore, personnel transport craft body 332 may be configured having entrance/exit hatch 332 for the purpose of entering/exiting the spacecraft via this hatch.

Moreover, personnel transport craft 300 may be configured having rotating electromagnetic drives for launch and stability, such as rotating electromagnetic rings 320. Rotating electromagnetic rings 320 may include a plurality of rotating electromagnetic ring 320 segments, such as first rotating electromagnetic ring 321 may be positioned proximate a top of personnel transport craft 300 or proximate crew/flight control module 310 and second rotating electromagnetic ring 322 may be positioned proximate a bottom of personnel transport craft 300 or proximate propulsion/steering engines 330. Rotating electromagnetic ring 320 are configured to rotate with varying speed, such as increasing/decreasing speed, to aid in the control launch, transport, travel, maneuvering, docking, and landing of personnel transport craft 300. Furthermore, rotating electromagnetic ring 320 may be configured to exert a rotating magnetic field MF via varying rotation speed and magnetic levels of rotating electromagnetic ring 320, around personnel transport craft 300 for the purpose of controlling, launching, docking, and landing of personnel transport craft 300 by controlled electromagnetic interaction between rotating electromagnetic ring 320 and charged plates 182.

For example, when launching, docking, steering and landing of personnel transport craft 300 to and from moon/planet surface landing platform 180 of moon complex 100 electromagnetic interaction between rotating electromagnetic ring 320 and charged plates 182 of moon/planet surface landing platform 180 control and stabilize launching, docking, steering and landing of personnel transport craft 300 being controlled by operators in control/observation tower 170 of moon complex 100. In addition, when launching, docking, steering, and landing of personnel transport craft 300 to and from moon docking portals 224 of moon orbiting craft 200 electromagnetic interaction between rotating electromagnetic ring 320 and charged plates 182 of moon orbiting craft 200 control and stabilize launching, docking, steering, and landing of personnel transport craft 300 being controlled by operators in command module 220 of moon orbiting craft 200.

Moreover, personnel transport craft 300 may be configured having an electromagnetic stability systems, such as personnel transport rotating electromagnetic plates 340. Personnel transport rotating electromagnetic plates 340 may include a plurality rotating electromagnetic plates 340, such as first rotating electromagnetic plate 341 may be affixed to an end of first landing leg 361, second rotating electromagnetic plate 342 may be affixed to an end of second landing leg 362, third rotating electromagnetic plate 343 may be affixed to an end of third landing leg 363, and fourth rotating electromagnetic plate 344 may be affixed to an end of fourth landing leg 364. Each personnel transport rotating electromagnetic plates 340 may be attached at the foot of each landing legs 360 of personnel transport craft 300 to provide a stable footing for personnel transport craft 300.

Personnel transport rotating electromagnetic plates 340 are configured to rotate with increasing/decreasing speed, to aid in the control of launch, transport, travel, maneuvering, docking, and landing of personnel transport craft 300. Furthermore, personnel transport rotating electromagnetic plates 340 may be configured to exert a rotating magnetic field MF via rotation speed and magnetic levels, around personnel transport craft 300 for the purpose of controlling, launching, docking, and landing of personnel transport craft 300 by controlled electromagnetic interaction between personnel transport rotating electromagnetic plates 340 and charged plates 182.

For example, when launching, docking, steering, and landing of personnel transport craft 300 to and from moon/planet surface landing platform 180 of moon complex 100 electromagnetic interaction between personnel transport rotating electromagnetic plates 340 and charged plates 182 of moon/planet surface landing platform 180 control and stabilize launching, docking, steering, and landing of personnel transport craft 300 being controlled by operators in control/observation tower 170 of moon complex 100. In addition, when launching, docking, steering, and landing of personnel transport craft 300 to and from moon docking portals 224 of moon orbiting craft 200 electromagnetic interaction between personnel transport rotating electromagnetic plates 340 and charged plates 182 of moon orbiting craft 200 control and stabilize launching, docking, steering, and landing of personnel transport craft 300 being controlled by operators in command module 220 of moon orbiting craft 200.

Moreover, personnel transport craft 300 may be launched from moon complex 100 via magnetic vortex accelerator 150 configured therein accelerator shaft 117 and controlled by operators in control/observation tower 170 of moon complex 100 at a high rate of speed to lunar/planet orbit or to land or dock personnel transport craft 300 on moon orbiting craft 200 controlled by operators in command module 220 of moon orbiting craft 200.

Referring now to FIGS. 4A, 4B and 4C, by way of example, and not limitation, there is illustrated an example embodiment of a spacecraft 500 or large personnel egress transport (1-pet), such as personnel and cargo craft 400, a spacecraft designed to transport personnel, crew, and bulk supplies to, from, and between moon complex 100 and moon orbiting craft 200. Personnel and cargo craft 400 may be configured having crew/flight module, such as control module 410 to maintain crew during transport and enable flight control for the viewing and control of personnel and cargo craft 400, through launching/decent moon complex 100 and moon orbiting craft 200. Personnel and cargo transport craft 400 may be configured having personnel module 415 to maintain personnel during transport between moon orbiting craft 200 and moon complex 100 and enable flight and transport around moon complex 100. Personnel and cargo transport craft 400 may be configured having cargo module 426 to maintain cargo during transport between moon orbiting craft 200 and moon complex 100 and enable flight and transport around moon complex 100. Personnel and cargo craft 400 may be further configured having craft body 425 affixed on one end to crew/flight control module 410 and extending therefrom the other end and on an underside or elsewhere on craft body 425 may be thrusters or steering system, such as one or more propulsion engines 430, whether ion, nuclear, hydrogen, kerosene, or any other standard spacecraft fuel or propulsion system to control launch, transport, travel, maneuvering, docking, and landing of personnel and cargo craft 400. One or more propulsion engines 430 may include bottom thrusters, such as first thruster 431, second thruster 432, third thruster 433, and fourth thruster 434 positioned under or on a side of craft body 425; and rear thrusters, such as fifth thruster 435 and sixth thruster 436 positioned on a back side of craft body 425. One or more propulsion/steering engines 430 may be configured having nozzle 431 for the purpose of maneuvering personnel and cargo craft 400 through controlled vectoring during launching, docking, steering, and landing of personnel and cargo craft 400, or any movements that require these thrusters to be engaged, such as emergency operations.

Moreover, personnel and cargo craft 400 may include passenger viewing ports 450, such as first passenger viewing port 451, second passenger viewing port 452, third passenger viewing port 453, and fourth passenger viewing port 454 positioned therein craft body 425.

Craft body 425 may include landing gear, such as a set of landing legs 460 extending therefrom craft body 425. Landing legs 460 may include first landing leg 461, second landing leg 462, third landing leg 463, and fourth landing leg 464 to stabilize docked personnel and cargo craft 400. Furthermore, craft body 425 may be configured having entrance/exit hatch 455 for the purpose of personnel and cargo entering/exiting the spacecraft via this hatch.

Moreover, personnel and cargo craft 400 may be configured having large rotating electromagnetic drives for launch and stability, such as personnel and cargo transport large rotating electromagnetic plates 420. Personnel and cargo transport rotating electromagnetic plates 420 may include a first plurality large rotating electromagnetic plates 420, such as a pair of large rotating electromagnetic plates 420 may be positioned proximate a top or upper of personnel and cargo craft 400, such as first large rotating electromagnetic plate 421 and second large rotating electromagnetic plates 422 may be positioned proximate a top side of personnel and cargo craft 400. Moreover, personnel and cargo transport large rotating electromagnetic plates 420 may include a second plurality of large rotating electromagnetic plates 420, such as a pair of large rotating electromagnetic plates 420 may be positioned proximate a bottom or lower side of personnel and cargo craft 400, such as third large rotating electromagnetic plate 423 and fourth large rotating electromagnetic plate 424 may be positioned proximate a bottom side of personnel and cargo craft 400.

Personnel and cargo transport large rotating electromagnetic plates 420 are configured to rotate with increasing/decreasing speed, to aid in the control launch, transport, travel, maneuvering, docking, and landing of personnel and cargo craft 400. Furthermore, personnel transport large rotating electromagnetic plates 420 may be configured to exert a rotating magnetic field MF via varying rotation speed and magnetic levels of large rotating electromagnetic plates 420, around personnel and cargo craft 400 for the purpose of controlling, launching, docking, and landing of personnel and cargo craft 400 by controlled electromagnetic interaction between personnel and cargo transport large rotating electromagnetic plates 420 and charged plates 182.

For example, when launching, docking, steering and landing of personnel and cargo craft 400 to and from moon/planet surface landing platform 180 of moon complex 100 electromagnetic interaction between personnel and cargo transport large rotating electromagnetic plates 420 and charged plates 182 of moon/planet surface landing platform 180 control and stabilize launching, docking, steering and landing of personnel and cargo craft 400 being controlled by operators in control/observation tower 170 of moon complex 100. In addition, when launching, docking, steering, and landing of personnel and cargo craft 400 to and from moon docking portals 224 of moon orbiting craft 200 electromagnetic interaction between personnel and cargo large rotating electromagnetic plates 420 and charged plates 182 of moon orbiting craft 200 control and stabilize launching, docking, steering, and landing of personnel and cargo craft 400 being controlled by operators in command module 220 of moon orbiting craft 200.

Moreover, personnel and cargo craft 400 may be configured having an electromagnetic stability systems, such as personnel and cargo transport rotating electromagnetic plates 440. Personnel and cargo transport rotating electromagnetic plates 440 may include a plurality rotating electromagnetic plates 440, such as first rotating electromagnetic plate 441 may be affixed to an end of first landing leg 461, second rotating electromagnetic plate 442 may be affixed to an end of second landing leg 462, third rotating electromagnetic plate 443 may be affixed to an end of third landing leg 463, and fourth rotating electromagnetic plate 444 may be affixed to an end of fourth landing leg 464. Each personnel and cargo transport rotating electromagnetic plates 440 may be attached at the foot of each landing legs 460 of personnel and cargo craft 400 to provide a stable footing for personnel and cargo craft 400.

Personnel and cargo transport rotating electromagnetic plates 440 are configured to rotate with increasing/decreasing speed, to aid in the control of launch, transport, travel, maneuvering, docking, and landing of personnel and cargo craft 400. Furthermore, personnel transport rotating electromagnetic plates 440 may be configured to exert a rotating magnetic field MF via varying rotation speed and magnetic levels, around personnel and cargo craft 400 for the purpose of controlling, launching, docking, and landing of personnel and cargo craft 400 by controlled electromagnetic interaction between personnel transport rotating electromagnetic plates 440 and charged plates 182.

For example, when launching, docking, steering, and landing of personnel and cargo craft 400 to and from moon/planet surface landing platform 180 of moon complex 100 electromagnetic interaction between personnel and cargo transport rotating electromagnetic plates 440 and charged plates 182 of moon/planet surface landing platform 180 control and stabilize launching, docking, steering, and landing of personnel and cargo craft 400 being controlled by operators in control/observation tower 170 of moon complex 100. In addition, when launching, docking, steering, and landing of personnel and cargo craft 400 to and from moon docking portals 224 of moon orbiting craft 200 electromagnetic interaction between personnel and cargo transport rotating electromagnetic plates 440 and charged plates 182 of moon orbiting craft 200 control and stabilize launching, docking, steering, and landing of personnel and cargo transport craft 400 being controlled by operators in command module 220 of moon orbiting craft 200.

Moreover, personnel and cargo craft 400 may be launched from moon complex 100 via magnetic vortex accelerator 150 configured therein accelerator shaft 117 and controlled by operators in control/observation tower 170 of moon complex 100 at a high rate of speed to lunar/planet orbit or to land or dock personnel and cargo craft 400 on moon orbiting craft 200 controlled by operators in command module 220 of moon orbiting craft 200.

Referring now to FIGS. 5A, 5B, 5C and 5D, by way of example, and not limitation, there is illustrated an example embodiment of a spacecraft 500, such as personnel transport craft 300 and personnel and cargo craft 400, having rotating electromagnetic plates 340/440/420. Rotating electromagnetic plates 340/440/420 may be configured having a central core of a plurality of charged plates 182. Charged plates 182 may be configured having a charging surface 182 to create a magnetic field of magnetic field of flux (Gauss units). Charged plates 182 may be affixed to two axis directional assembly 184 capable of angling charged plates 182 in an x-direction and y-direction. Moreover, rotating electromagnetic plates 340/440/420 may be configured having a plurality of super magnets 510 formed from a super magnet material core 512 wrapped by windings or coils of superconducting coil 514 operating in low temperatures and vacuum of space, absolute zero cold, or at a few kelvin or "K" to form a super magnetic field of magnetic field of flux (Tesla units). Each of the plurality of super magnets 510 may be directionally pivoted about two axis directional assembly 516 to vary the direction of the electromagnetic fields. Each charged plates 182 may be directionally pivoted about two axis directional assembly 184 to vary the direction of the electromagnetic fields, and to vary the electrical power of superconducting coil 514, varying the power of the electromagnetic fields, magnetic fields, charged coils, or any combination thereof, and, thus control spacecraft 500 landing, or taking off, especially for the purpose of slowing and controlling the rate of decent and stoppage of an approaching or landing spacecraft 500, via controlled electromagnetic interaction in the direction of plurality of charged plates 182.

Furthermore, plurality of charged plates 182 may be configured having plurality of super magnets 510 positioned radially around a rotating stack of plurality of charged plates 182 to form a super magnet assembly. Each super magnets 510 may be rotated about the plurality of charged plates 182 to vary the direction of the electromagnetic fields, and to vary the electrical power of superconducting coil 514, varying the power of the electromagnetic fields, magnetic fields, charged coils, or any combination thereof, and, thus control spacecraft 500 landing, or taking off, especially for the purpose of slowing and controlling the rate of decent and stoppage of an approaching or landing spacecraft 500, via controlled electromagnetic interaction in the direction of plurality of charged plates 182.

Still furthermore, plurality of charged plates 182 and plurality of super magnets 510 may be housed in a mounting assembly between top cover 531 and bottom cover 532 to protect plurality of charged plates 182 and plurality of rotating super magnets 510. Plurality of super magnets 510 are configured to rotate around isolation unit 550, where rotation may be provided via tracks, bearings, or frozen substance and electrical-mechanical apparatus or electromagnetic lift and/or rotation or other like rotational apparatus 112 capable of providing rotation R thereto plurality of super magnets 510.

Referring now to FIGS. 6A and 6B, by way of example, and not limitation, there is illustrated an example embodiment of a spacecraft 500, such as personnel transport craft 300, having rotating electromagnetic rings 320. Rotating electromagnetic rings 320 may be configured having a plurality of super magnets 510 formed from a super magnet material core 512 wrapped by windings or coils of superconducting coil 514 operating in low temperatures and vacuum of space, absolute zero cold, or at a few kelvin or "K" to form a super magnetic field of magnetic field of flux (Tesla units). Each of the plurality of super magnets 510 may be directionally pivoted about two axis directional assembly 516 to vary the direction of the electromagnetic fields.

Moreover, plurality of super magnets 510 may be housed in an mounting assembly between top curved bracket 631 and bottom curved bracket 632 to support therebetween rotational member 650 configured to rotate.

Furthermore, rotational member 650 may be configured having plurality of super magnets 510 positioned radially around a rotating rotational member 650 to form a super magnet assembly. Each super magnets 510 may be rotated about rotational member 650 to vary the direction of the electromagnetic fields, and to vary the electrical power of superconducting coil 514, varying the power of the electromagnetic fields, magnetic fields, charged coils, or any combination thereof, and, thus control spacecraft 500 landing, or taking off, especially for the purpose of slowing and controlling the rate of decent and stoppage of an approaching or landing spacecraft 500, via controlled electromagnetic interaction in the direction of plurality of charged plates 182.

Rotational member 650 with increasing/decreasing rotational speed, to aid in the control launch, transport, travel, maneuvering, docking, and landing of personnel transport craft 300. Furthermore, rotating electromagnetic ring 320 may be configured to exert a rotating magnetic field MF via rotation speed and magnetic levels of rotating electromagnetic ring 320, around personnel transport craft 300 for the purpose of controlling, launching, docking, and landing of personnel transport craft 300 by controlled electromagnetic interaction between rotating electromagnetic ring 320 and charged plates 182.

It is contemplated herein that as personnel transport craft 300 and personnel and cargo craft 400 may utilize any variety of rotating electromagnetic rings 320 and/or rotating electromagnetic plates 340/440/420 with increasing/decreasing rotational speed, to aid in the control launch, transport, travel, maneuvering, docking, and landing of personnel transport craft 300 or personnel and cargo craft 400.

It is further contemplated herein that two or more of rotating electromagnetic rings 320 and/or rotating electromagnetic plates 340/440/420 may be configured to synchronize and tune to each other.

With respect to the above description then, it is to be realized that the optimum dimensional relationships, to include variations in size, materials, shape, form, position, function and manner of operation, assembly and use, are intended to be encompassed by the present disclosure.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A moon outpost operational about a lunar surface craft, said moon outpost comprising:
   a personnel transport craft configured to transport personnel, said personnel transport craft having a plurality of rotating electromagnetic rings; and
   a moon orbiting craft orbiting above the lunar surface having:
      a spacecraft body;
      a habitat module, said habitat module rotates about said spacecraft body to provide rotational forces to simulate a gravity environment;
      a synchronized interface tunnel formed around said habitat module between said spacecraft body and said habitat module, said synchronized interface tunnel having a transport module configured to traverse therein to synchronize and lock in rotation with said habitat module to enable personnel to traverse between said rotating habitat module having said gravity environment and said spacecraft body;
      a command module affixed to said habitat module;
      an orbiting landing platform configured having a first plurality of charged plates to steer and control a rate of said personnel transport craft, said first plurality of charged plates are configured to generate electromagnetic fields to interact with said rotating electromagnetic rings to steer and control said rate of said personnel transport craft proximate said moon orbiting craft;
      a docking portal configured to dock said personnel transport craft;
      a propulsion system to maintain a position of said moon orbiting craft; and
   a landing platform positioned on the lunar surface, said landing platform having a second plurality of charged plates to steer and control said rate of said personnel transport craft, said second plurality of charged plates are configured to generate electromagnetic fields to interact with said rotating electromagnetic rings to steer and control said rate of said personnel transport craft proximate said orbiting landing platform.

2. The moon outpost of claim 1, wherein said moon orbiting craft further comprises a maintenance bay affixed to said spacecraft body.

3. The moon outpost of claim 1, wherein said spacecraft body, said habitat module, and said command module are configured having a protective shield.

4. The moon outpost of claim 1, wherein said spacecraft body is configured having spaceport sensors in communication with said command module.

5. The moon outpost of claim 4, wherein said command module is in communication with said habitat module.

6. The moon outpost of claim 1, wherein said first plurality of charged plates are configured to generate electromagnetic fields to interact with said personnel transport craft proximate said moon orbiting craft.

7. The moon outpost of claim 6, further comprising a moon complex on a lunar surface configured to docking and transport of said personnel transport craft, said moon complex having
an underground maintenance module;
an underground rotating habitat module proximate said maintenance module, said underground rotating habitat module to provide rotational forces to simulate a gravity environment;
a synchronized interface tunnel formed around said rotating habitat module and between said underground maintenance module and said rotating habitat module, said synchronized interface tunnel having a transport module configured to traverse therein to synchronize and lock therebetween said underground maintenance module and said rotating habitat module to enable personnel to traverse between said rotating habitat module having said gravity environment and said underground maintenance module; and
an elevator positioned between said underground maintenance module and said surface landing platform, said elevator to move personnel and cargo between said underground maintenance module and the lunar surface.

8. The moon complex of claim 7, wherein said first plurality of charged plates are configured to generate electromagnetic fields to interact with said personnel transport craft proximate the lunar surface during a landing and a takeoff from the lunar surface.

9. The moon complex of claim 7, further comprising a spacecraft elevator, said spacecraft elevator positioned between said underground maintenance module and said surface landing platform, said spacecraft elevator to move said personnel transport craft between said underground maintenance module and the lunar surface.

10. The moon complex of claim 7, further comprising a magnetic vortex accelerator shaft proximate said underground maintenance module, said magnetic vortex accelerator shaft having a high energy electromagnetic force to launch said personnel transport craft from said underground maintenance module into an orbit.

11. The moon complex of claim 7, further comprising a plurality of surface domes configured for growing food.

12. The moon complex of claim 7, further comprising a control tower to communicate with said personnel transport craft.

13. The moon complex of claim 10, further comprising a magnetic interference shield formed between said magnetic vortex accelerator shaft and said underground maintenance module.

14. The moon complex of claim 11, wherein said plurality of surface domes are configured for transformation processes of a lunar soil.

15. The moon outpost of claim 8, wherein said personnel transport craft further comprises:
a control module having spacecraft controls;
a rotating passenger module configured to transport the personnel, said rotating passenger module to provide rotational forces to simulate a gravity environment;
a craft body affixed on one end to said control module and a propulsion engine affixed to the other end, said propulsion engine configured to maneuver the personnel transport craft, said craft body having a hatch, said craft body having one or more rotating electromagnetic rings affixed thereto, said one or more rotating electromagnetic rings configured to exert a rotating magnetic field to interact with said first plurality of charged plates; and
a plurality of landing legs extend from said craft body to stabilize the personnel craft when landing, each of said landing leg having a rotating electromagnetic plate, said rotating electromagnetic plate configured to exert a rotating magnetic field to interact with said first plurality of charged plates;
a synchronized interface tunnel formed around said rotating passenger module between said craft body and said rotating passenger module, said synchronized interface tunnel having a transport module configured to traverse therein to synchronize and lock therebetween said craft body and said rotating passenger module to enable personnel to traverse between said rotating passenger module having said gravity environment and said craft body.

16. The moon complex of claim 15, wherein said one or more rotating electromagnetic rings rotate with a varying speed to aid in the control of said personnel transport craft proximate said first plurality of charged plates.

17. The moon complex of claim 15, wherein said one or more rotating electromagnetic rings rotate with a varying magnetic level to aid in the control of said personnel transport craft proximate said first plurality of charged plates.

18. The moon complex of claim 15, wherein said rotating electromagnetic plate rotates with a varying speed to aid in the control of said personnel transport craft proximate said first plurality of charged plates.

19. The moon complex of claim 15, wherein said rotating electromagnetic plate rotates with a varying magnetic level to aid in the control of said personnel transport craft proximate said first plurality of charged plates.

20. The moon orbiting craft of claim 8, further comprising a personnel and cargo craft to shuttle personnel and cargo between said moon complex and said moon orbiting craft, said personnel and cargo craft comprising:
a control module having spacecraft controls;
a passenger module and a cargo module configured to transport the personnel and cargo;
a craft body affixed on one end to said control module and at least one propulsion engine affixed to the other end, said at least one propulsion engine configured to maneuver said personnel and cargo craft, said craft body having a hatch, said craft body configured having at least one upper rotating electromagnetic plate and at least one lower rotating electromagnetic plate affixed thereto, said at least one upper rotating electromagnetic plate and at least one lower rotating electromagnetic plate configured to exert a rotating magnetic field to interact with said first plurality of charged plates; and
a plurality of landing legs extend from said craft body to stabilize said personnel and cargo craft when landing, each of said landing leg having a rotating electromagnetic plate, said rotating electromagnetic plate configured to exert a rotating magnetic field to interact with said first plurality of charged plates.

21. The moon complex of claim 20, wherein said at least one upper rotating electromagnetic ring and at least one lower rotating electromagnetic ring rotate with a varying speed to aid in the control of said personnel and cargo craft proximate said first plurality of charged plates.

22. The moon complex of claim 20, wherein said at least one upper rotating electromagnetic ring and at least one lower rotating electromagnetic ring rotate with a varying magnetic level to aid in the control of said personnel and cargo craft proximate said first plurality of charged plates.

23. The moon complex of claim 20, wherein said rotating electromagnetic plate rotates with a varying speed to aid in the control of said personnel and cargo craft proximate said first plurality of charged plates.

24. The moon complex of claim 20, wherein said rotating electromagnetic plate rotates with a varying magnetic level to aid in the control of said personnel and cargo spacecraft proximate said first plurality of charged plates.

25. The moon complex of claim 20, wherein said craft body further comprising a passenger viewing port.

26. The moon complex of claim 20, wherein said at least one propulsion engine positioned proximate an underside of said craft body.

* * * * *